Feb. 24, 1931.                H. W. DIETRICH                1,793,782
                    FRAME MOUNTING FOR MOPS AND THE LIKE
                           Filed Aug. 10. 1929
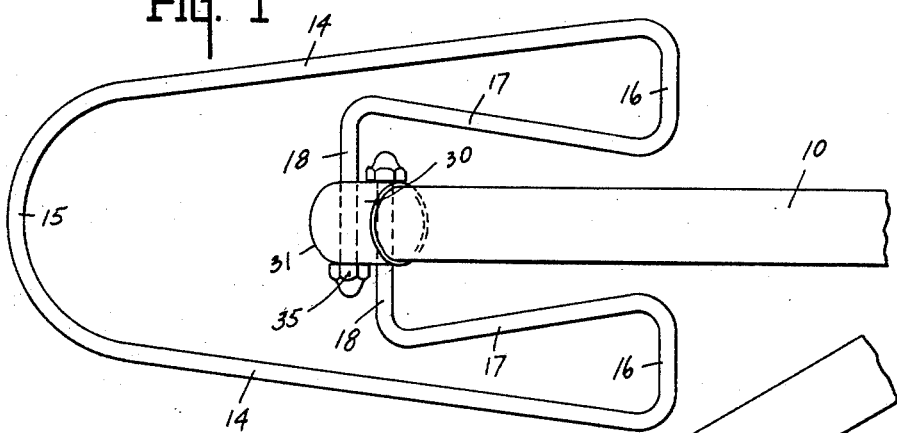
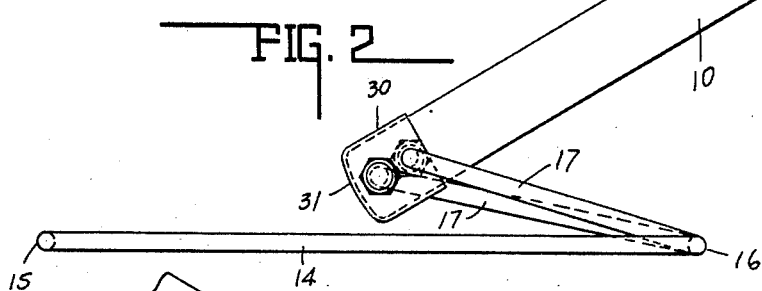
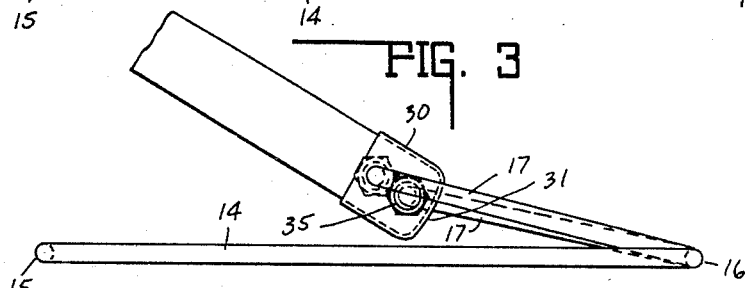
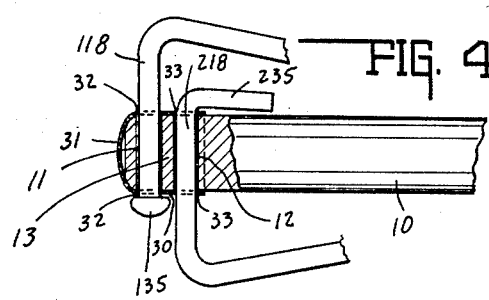
INVENTOR.
HARRY W. DIETRICH.
BY Lockwood Lockwood
   Goldsmith & Salt
ATTORNEYS.

Patented Feb. 24, 1931

1,793,782

UNITED STATES PATENT OFFICE

HARRY W. DIETRICH, OF NOBLESVILLE, INDIANA, ASSIGNOR TO J. I. HOLCOMB MANUFACTURING COMPANY, OF INDIANAPOLIS, INDIANA, A CORPORATION

FRAME MOUNTING FOR MOPS AND THE LIKE

Application filed August 10, 1929. Serial No. 384,851.

This invention relates to a mop, duster or the like, of a general character shown in the Anderson Patent No. 1,714,291.

The chief object of this invention is to simplify the mounting between the head and the handle of the aforesaid patent and retain all of the advantages thereof and in addition obtain a relatively fool-proof construction.

The chief feature of the invention consists in a swivel type tension-providing mounting between the head and handle through the direct mounting of the ends of a wire forming the head and upon said handle and in spaced relation to each other.

Another feature of the invention consists in the protection of the end of the handle and the reinforcement thereof by a closed end ferrule.

The full nature of the invention will be more clearly understood from the accompanying drawings and the following description and claims:

Fig. 1 is a top plan view of a mop, duster or the like, frame including the head, a portion of the handle and the connection therebetween. Fig. 2 is a side elevation thereof with the handle arranged in one position relative to the head. Fig. 3 is a view similar to Fig. 2 but illustrates the handle in a second position and applying tension to the head. Fig. 4 is a top plan view of that portion of the head associated with the handle and the handle associated portion, parts being broken away to show the same, and other parts in section, and said figure illustrating two modified forms of the invention.

In the drawings 10 indicates a handle which is provided at its lower end with a pair of transversely extending openings 11 and 12, said openings being herein shown parallel and positioned relatively close together but separated as at 13 from each other.

The head of the frame consists of a pair of angularly-directed wire portions 14 connected at one end by a curved portion 15 and the diverging ends are provided with inward extensions 16. Each inward extension 16 terminates short of the other in an upwardly and outwardly, as well as forwardly, directed portion 17, the same terminating midway between the ends of the head and each in turn including an inwardly-directed free end 18, the two ends 18 being arranged in parallel and spaced relation and being substantially overlapping at the longitudinal center of the head. The resultant shape of the head is that of a sad iron and the handle mounting is arranged near the center thereof.

A ferrule 30 having a closed end 31 is telescopically received by the apertured end of the handle, and said ferrule includes the registering apertures 32 and 33 which are in alignment with the openings 11 and 12 in the handle. In Figures 1 to 3, inclusive, each free end 18 extends through the openings in the ferrule and the handle and terminates in a threadedly mounted knob 35 to prevent longitudinal withdrawal of the free end.

In Fig. 4 two modified forms of the invention are illustrated. The free end 118 terminates in an upset or rivet enlargement 135 for retaining the end 118 against lateral escapement.

The free end 218 in said figure is shown provided with an angular end portion 235 which accomplishes the same purpose.

As shown in the several figures the upward direction of the ends 17 positions the connection between the handle and the free ends of the head slightly above the plane of the head so that the handle may be tilted forwardly from the position shown in Fig. 2 to the position shown in Fig. 3, or to any intermediate position without interfering with the fabric or swatch carried by the head and when thus positioned in any intermediate position or like that shown in Fig. 3, the cooperating relationship between the ends of the head and handle is such that a yielding pressure is imparted to the head for pressing upon an object supporting the same.

The invention claimed is:

1. In a mop holder the combination of a handle having a pair of parallel openings extending transversely therethrough near one end and adjacent each other, and a mop head secured to the handle centrally of the outline of said mop head and otherwise free therefrom, said mop head being formed of a single wire having its mid-portion arranged in semi-elliptical outline formation with its side portions immediate continuations of the semi-elliptical portions, the rear ends of the side portions extending inwardly therefrom towards each other but terminating short of overlapping engagement, lateral extensions therefrom extending toward the center of the mop head, and terminal portions extending parallel to each other in overlapping but spaced arrangement, each terminal portion passing through one of the handle openings, and having means on its end to prevent separation from the handle.

2. In a mop holder the combination of a handle having a pair of parallel openings extending transversely therethrough near one end and adjacent each other, a mop head secured to the handle centrally of the outline of said mop head and otherwise free therefrom, said mop head being formed of a single wire having its mid-portion arranged in semi-elliptical outline formation with its side portions constituting immediate continuations of the semi-elliptical portions, the rear ends of the side portions extending inwardly therefrom towards each other but terminating short of overlapping engagement, lateral extensions therefrom extending toward the center of the mop head, and terminal portions extending parallel to each other in overlapping but spaced arrangement, each terminal portion passing through one of the handle openings, and having means on its end to prevent separation from the handle, and a ferrule peripherally enclosing the apertured handle end and including perforations registering with the handle openings for reinforcing the head supporting portion of the handle.

3. In a mop holder the combination of a handle having a pair of parallel openings extending transversely therethrough near one end and adjacent each other, a mop head secured to the handle centrally of the outline of said mop head and otherwise free therefrom, said mop head being formed of a single wire having its mid-portion arranged in semi-elliptical outline formation with its side portions immediate continuations of the semi-elliptical portions, the rear ends of the side portions extending inwardly therefrom towards each other but terminating short of overlapping engagement, lateral extensions therefrom extending toward the center of the mop head, and terminal portions extending parallel to each other in overlapping but spaced arrangement, each terminal portion passing through one of the handle openings, and having means on its ends to prevent separation from the handle, and a ferrule peripherally enclosing the apertured handle end and including perforations registering with the handle openings for reinforcing the head supporting portion of the handle, said ferrule being of the closed end type and telescopically receiving the apertured end of the handle.

In witness whereof, I have hereunto affixed my signature.

HARRY W. DIETRICH.